United States Patent
Hirose

(10) Patent No.: US 9,268,510 B2
(45) Date of Patent: Feb. 23, 2016

(54) INFORMATION PROCESSING APPARATUS AND CONNECTION CONTROL METHOD FOR SEARCHING FOR A PRINTER HAVING A PREDETERMINED FUNCTION IDENTIFIED BY IDENTIFICATION INFORMATION INCLUDED IN A BEACON SIGNAL AND SENDING A PRINT REQUEST DIRECTLY TO THE PRINTER WHICH IS OPERATING AS AN ACCESS POINT WITHOUT GOING THROUGH AN EXTERNAL ACCESS POINT

(71) Applicant: CANON KABUSHIKI KAISHA, Tokyo (JP)

(72) Inventor: Takatoshi Hirose, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/102,779

(22) Filed: Dec. 11, 2013

(65) Prior Publication Data

US 2014/0098250 A1 Apr. 10, 2014

Related U.S. Application Data

(63) Continuation of application No. 10/551,174, filed as application No. PCT/JP2004/005233 on Apr. 13, 2004, now Pat. No. 8,756,305.

(30) Foreign Application Priority Data

Apr. 23, 2003 (JP) ................. 2003-118839

(51) Int. Cl.
*G06F 3/12* (2006.01)
*G06F 15/16* (2006.01)
(Continued)

(52) U.S. Cl.
CPC ............ *G06F 3/1226* (2013.01); *G06F 3/1204* (2013.01); *G06F 3/128* (2013.01);
(Continued)

(58) Field of Classification Search
CPC ... H04L 29/06; H04L 67/16; H04L 29/08396; H04L 69/24; H04L 48/16; H04L 67/04; H04W 4/00; H04W 8/005; G06F 3/1204; G06F 3/1232; G06F 3/1236; G06F 3/128; G06F 3/1292
USPC .......... 709/223, 224, 227; 370/245, 328, 338; 358/1.15
See application file for complete search history.

(56) References Cited

U.S. PATENT DOCUMENTS 4,905,234 A 2/1990 Childress et al.
5,261,117 A 11/1993 Olson .......................... 455/34.1
(Continued)

FOREIGN PATENT DOCUMENTS

CN 1375772 A 10/2002 .............. G06F 11/34
EP 1 022 876 A1 7/2000
(Continued)

OTHER PUBLICATIONS

Nikkei Zerowan, "Enjoy routers and AV equipment and robots with broadband wirelessly", Wireless LAN peripherals, Mar. 1, 2002, Nikkei Home Publications, No. 3 (the 70$^{th}$ issue), pp. 22-27.
(Continued)

*Primary Examiner* — Daniel C Murray
(74) *Attorney, Agent, or Firm* — Fitzpatrick, Cella, Harper, & Scinto

(57) ABSTRACT

Identification information for identifying each network out of a plurality of wireless networks is received. A wireless network identified by arbitrary identification information is wirelessly connected. Whether a printer in the wirelessly connected wireless network has a function of connecting a digital camera and performing output processing is inquired of the printer. Connection to the printer is controlled in accordance with a response to the inquiry. The digital camera performs output processing together with the connected printer. An information output apparatus having a function of connecting an information storage terminal apparatus by simple operation and performing output processing can be wirelessly connected.

11 Claims, 10 Drawing Sheets

(51) Int. Cl.

| | | |
|---|---|---|
| *G06F 15/173* | (2006.01) | |
| *H04L 12/26* | (2006.01) | |
| *H04W 4/00* | (2009.01) | |
| *H04L 29/06* | (2006.01) | |
| *H04W 8/00* | (2009.01) | |
| *H04L 29/08* | (2006.01) | |
| *H04W 84/12* | (2009.01) | |
| *H04W 48/16* | (2009.01) | |

(52) U.S. Cl.
CPC ........... *G06F 3/1232* (2013.01); *G06F 3/1236* (2013.01); *G06F 3/1292* (2013.01); *H04L 29/06* (2013.01); *H04L 29/08396* (2013.01); *H04L 67/16* (2013.01); *H04W 4/00* (2013.01); *H04W 8/005* (2013.01); *H04W 84/12* (2013.01); *H04L 67/04* (2013.01); *H04L 69/24* (2013.01); *H04L 69/329* (2013.01); *H04W 48/16* (2013.01)

(56) References Cited

U.S. PATENT DOCUMENTS

| | | | |
|---|---|---|---|
| 5,406,617 A | 4/1995 | Bauer | |
| 5,687,320 A | 11/1997 | Wiley et al. | 395/200.16 |
| 5,699,495 A | 12/1997 | Snipp | 395/114 |
| 5,768,516 A | 6/1998 | Sugishima | 395/200.47 |
| 5,818,603 A | 10/1998 | Motoyama | |
| 5,862,404 A | 1/1999 | Onaga | 395/828 |
| 5,898,823 A | 4/1999 | Sorkin et al. | 395/114 |
| 5,915,096 A | 6/1999 | Rosenzweig et al. | 395/200.57 |
| 5,937,148 A | 8/1999 | Okazawa | 395/112 |
| 6,000,864 A | 12/1999 | Hanada | |
| 6,065,123 A | 5/2000 | Chou et al. | 713/322 |
| 6,091,515 A | 7/2000 | Kimura | 358/434 |
| 6,101,555 A | 8/2000 | Goshey et al. | 709/301 |
| 6,104,886 A * | 8/2000 | Suzuki et al. | 396/429 |
| 6,115,137 A | 9/2000 | Ozawa et al. | 358/1.6 |
| 6,131,120 A | 10/2000 | Reid | 709/225 |
| 6,148,198 A | 11/2000 | Anderson et al. | 455/432 |
| 6,157,465 A | 12/2000 | Suda et al. | 358/407 |
| 6,163,816 A * | 12/2000 | Anderson et al. | 710/8 |
| 6,184,996 B1 | 2/2001 | Gase | 358/1.15 |
| 6,198,542 B1 | 3/2001 | Tabata | 358/1.15 |
| 6,249,814 B1 | 6/2001 | Shaffer et al. | 709/223 |
| 6,256,322 B1 | 7/2001 | Wilson, Jr. | 370/469 |
| 6,259,829 B1 | 7/2001 | Bleecker, III et al. | 382/306 |
| 6,308,227 B1 * | 10/2001 | Kumar et al. | 710/4 |
| 6,327,613 B1 | 12/2001 | Goshey et al. | 709/208 |
| 6,353,599 B1 * | 3/2002 | Bi et al. | 370/328 |
| 6,445,412 B1 | 9/2002 | Shiohara | 348/222 |
| 6,446,108 B1 | 9/2002 | Rosenberg et al. | 709/203 |
| 6,459,495 B1 | 10/2002 | Silverbrook | 358/1.09 |
| 6,477,570 B1 | 11/2002 | Takayama et al. | |
| 6,493,104 B1 | 12/2002 | Cromer et al. | 358/1.15 |
| 6,522,881 B1 | 2/2003 | Feder et al. | |
| 6,529,522 B1 | 3/2003 | Ito et al. | 370/466 |
| 6,552,743 B1 * | 4/2003 | Rissman | 348/207.2 |
| 6,553,431 B1 | 4/2003 | Yamamoto et al. | 710/8 |
| 6,577,338 B1 | 6/2003 | Tanaka et al. | |
| 6,584,311 B1 | 6/2003 | Sorenson et al. | 455/432 |
| 6,603,506 B2 | 8/2003 | Ogawa et al. | 348/207.2 |
| 6,618,553 B1 | 9/2003 | Shiohara | |
| 6,631,008 B2 | 10/2003 | Aoki | 358/1.15 |
| 6,633,757 B1 | 10/2003 | Hermann et al. | 455/414 |
| 6,650,795 B1 | 11/2003 | Motta | 382/312 |
| 6,665,712 B2 * | 12/2003 | Pickup | 709/219 |
| 6,693,665 B1 | 2/2004 | Shindo et al. | |
| 6,771,896 B2 | 8/2004 | Tamura et al. | 396/57 |
| 6,778,825 B1 | 8/2004 | Anderson et al. | 455/434 |
| 6,782,260 B2 | 8/2004 | Nakakita et al. | 455/435.1 |
| 6,813,037 B1 | 11/2004 | Collard | 358/1.15 |
| 6,816,067 B2 | 11/2004 | Patton | 340/505 |
| 6,820,126 B2 | 11/2004 | Sibecas et al. | |
| 6,823,198 B2 | 11/2004 | Kobayashi | |
| 6,839,755 B1 | 1/2005 | Kumpf et al. | 709/225 |
| 6,839,757 B1 | 1/2005 | Romano et al. | 709/226 |
| 6,862,594 B1 | 3/2005 | Saulpaugh et al. | 707/10 |
| 6,867,882 B1 | 3/2005 | Takahashi | |
| 6,876,382 B1 | 4/2005 | Sakamoto | |
| 6,920,506 B2 | 7/2005 | Barnard et al. | 709/245 |
| 6,981,033 B2 | 12/2005 | Simpson | 709/220 |
| 6,993,558 B2 | 1/2006 | Yokokura | 709/203 |
| 7,009,941 B1 | 3/2006 | Uchino | 370/254 |
| 7,038,714 B1 | 5/2006 | Parulski et al. | 348/207.2 |
| 7,042,496 B2 | 5/2006 | Sato | 348/207.2 |
| 7,062,579 B2 | 6/2006 | Tateyama et al. | |
| 7,072,053 B2 | 7/2006 | Guddanti | 358/1.13 |
| 7,072,056 B1 | 7/2006 | Greaves et al. | |
| 7,080,154 B1 | 7/2006 | Inoue et al. | 709/234 |
| 7,088,691 B2 | 8/2006 | Fujita | 370/311 |
| 7,102,640 B1 | 9/2006 | Aholainen et al. | |
| 7,103,313 B2 | 9/2006 | Heinonen et al. | |
| 7,103,357 B2 | 9/2006 | Kirani et al. | 455/426.1 |
| 7,106,357 B2 | 9/2006 | Fukuda et al. | |
| 7,120,129 B2 * | 10/2006 | Ayyagari et al. | 370/255 |
| 7,146,413 B2 * | 12/2006 | Spitzer et al. | 709/220 |
| 7,162,507 B2 * | 1/2007 | Carter | 709/200 |
| 7,170,857 B2 * | 1/2007 | Stephens | H04L 29/06 370/230 |
| 7,174,157 B2 | 2/2007 | Gassho et al. | 455/410 |
| 7,187,461 B2 | 3/2007 | Schlonski et al. | 358/1.15 |
| 7,190,471 B2 | 3/2007 | Sandfort et al. | 358/1.14 |
| 7,191,236 B2 | 3/2007 | Simpson-Young et al. | 709/228 |
| 7,199,895 B2 * | 4/2007 | Collier | G06F 3/1205 358/1.13 |
| 7,212,513 B2 * | 5/2007 | Gassho et al. | 370/338 |
| 7,239,416 B2 | 7/2007 | Ohmura et al. | 358/1.18 |
| 7,256,906 B2 | 8/2007 | Nakajima | 358/1.15 |
| 7,260,362 B2 | 8/2007 | Teibel | 455/69 |
| 7,295,524 B1 | 11/2007 | Gray et al. | 370/254 |
| 7,317,869 B2 | 1/2008 | Shiohara | 386/117 |
| 7,321,924 B2 | 1/2008 | Inoue et al. | 709/217 |
| 7,324,462 B1 * | 1/2008 | Page et al. | 370/255 |
| 7,324,805 B2 | 1/2008 | Nakakita et al. | 455/411 |
| 7,327,944 B2 | 2/2008 | Shiohara | 386/117 |
| 7,327,945 B2 | 2/2008 | Shiohara | 386/117 |
| 7,339,912 B2 * | 3/2008 | Oak | 370/338 |
| 7,343,086 B2 | 3/2008 | Shiohara | |
| 7,346,268 B2 | 3/2008 | Shiohara | |
| 7,346,269 B2 | 3/2008 | Shiohara | |
| 7,363,022 B2 * | 4/2008 | Whelan et al. | 455/411 |
| 7,366,103 B2 * | 4/2008 | Engwer et al. | 370/252 |
| 7,372,485 B1 | 5/2008 | Bodnar et al. | 348/234 |
| 7,379,660 B2 | 5/2008 | Shiohara | |
| 7,389,448 B2 | 6/2008 | Sakai | |
| 7,411,607 B2 | 8/2008 | Kikugawa | |
| 7,421,466 B2 | 9/2008 | Haines | 709/200 |
| 7,424,532 B1 * | 9/2008 | Subbiah | 709/226 |
| 7,440,459 B2 | 10/2008 | Casati | 370/395 |
| 7,450,824 B2 | 11/2008 | Shiohara | |
| 7,450,825 B2 | 11/2008 | Shiohara | |
| 7,455,229 B2 | 11/2008 | Tanaka | 235/462.01 |
| 7,463,378 B2 * | 12/2008 | Williams et al. | 358/1.15 |
| 7,466,357 B2 | 12/2008 | Myojo | |
| 7,474,839 B2 | 1/2009 | Shiohara | |
| 7,479,984 B2 | 1/2009 | Tanaka et al. | 348/207.2 |
| 7,502,049 B2 | 3/2009 | Aichi et al. | |
| 7,502,855 B2 | 3/2009 | Swanson et al. | 709/225 |
| 7,512,081 B2 * | 3/2009 | Ayyagari et al. | 370/255 |
| 7,519,697 B2 | 4/2009 | Matsukura | 709/223 |
| 7,522,906 B2 | 4/2009 | Whelan et al. | 455/411 |
| 7,523,212 B2 | 4/2009 | Woolf et al. | 709/230 |
| 7,533,165 B2 * | 5/2009 | Makino | 709/223 |
| 7,533,355 B2 | 5/2009 | Aritomi | 715/853 |
| 7,535,588 B2 | 5/2009 | Wang et al. | 358/1.15 |
| 7,545,406 B2 | 6/2009 | Itsukaichi | 348/207.2 |
| 7,557,827 B2 | 7/2009 | Ishiyama et al. | 348/207.2 |
| 7,561,782 B2 | 7/2009 | Shiohara | |
| 7,576,779 B2 | 8/2009 | Tanaka et al. | 348/211.4 |
| 7,586,889 B2 * | 9/2009 | Gassho et al. | 370/338 |
| 7,600,050 B2 | 10/2009 | Aritomi | 710/5 |
| 7,613,426 B2 * | 11/2009 | Kuehnel et al. | 455/41.2 |
| 7,664,081 B2 | 2/2010 | Luoma et al. | 370/338 |

(56) References Cited

U.S. PATENT DOCUMENTS

| | | | |
|---|---|---|---|
| 7,679,770 B2 | 3/2010 | Fertlitsch et al. | 358/1.15 |
| 7,680,494 B2* | 3/2010 | Karaoguz et al. | 455/426.1 |
| 7,684,438 B2* | 3/2010 | Stephens | H04L 29/06 370/465 |
| 7,689,720 B2 | 3/2010 | Dewey et al. | 709/248 |
| 7,719,699 B2 | 5/2010 | Tojo | |
| 7,719,706 B2 | 5/2010 | Suga et al. | |
| 7,719,707 B2 | 5/2010 | Onuma et al. | |
| 7,720,929 B2 | 5/2010 | Morohashi | |
| 7,730,219 B2* | 6/2010 | Chambers et al. | 709/250 |
| 7,804,520 B2 | 9/2010 | Suehiro | |
| 7,809,835 B2 | 10/2010 | Reunamäki et al. | 709/227 |
| 7,826,847 B1* | 11/2010 | Roskowski et al. | 455/436 |
| 7,830,411 B2 | 11/2010 | Shiohara | |
| 7,848,263 B2* | 12/2010 | Chhabra | 370/255 |
| 7,864,350 B2 | 1/2011 | Endo et al. | |
| 7,876,358 B2 | 1/2011 | Yamada et al. | |
| 7,880,910 B2 | 2/2011 | Aichi et al. | |
| 7,881,715 B2 | 2/2011 | Kirani et al. | |
| 7,882,234 B2 | 2/2011 | Watanabe et al. | 709/227 |
| 7,889,385 B2 | 2/2011 | Toda | |
| 7,936,918 B2 | 5/2011 | Silverbrook et al. | |
| 7,941,148 B2* | 5/2011 | Roskowski et al. | 455/436 |
| 7,949,223 B2 | 5/2011 | Shiohara | |
| 7,961,345 B2 | 6/2011 | Yano et al. | |
| 7,965,908 B2 | 6/2011 | Hayashi | 382/305 |
| 7,969,467 B2 | 6/2011 | Matsutani | |
| 7,974,574 B2* | 7/2011 | Shen et al. | 455/11.1 |
| 7,983,523 B2 | 7/2011 | Shiohara | |
| 7,984,196 B2 | 7/2011 | Hirose et al. | 709/253 |
| 8,037,218 B2 | 10/2011 | Fujii et al. | 710/38 |
| 8,064,366 B2* | 11/2011 | Page et al. | 370/255 |
| 8,131,859 B2 | 3/2012 | Fujii et al. | 709/228 |
| 8,140,642 B1 | 3/2012 | Kadam et al. | 709/218 |
| 8,156,229 B2 | 4/2012 | Reunamäki et al. | 709/227 |
| 8,170,481 B2* | 5/2012 | Rangarajan et al. | 455/41.2 |
| 8,199,201 B2 | 6/2012 | Gyotoku | 348/207.2 |
| 8,245,284 B2* | 8/2012 | Jiang et al. | 726/7 |
| 8,250,218 B2 | 8/2012 | Watanabe et al. | 709/227 |
| 8,290,488 B2* | 10/2012 | Chen | 455/434 |
| 8,296,413 B2 | 10/2012 | Bornhoevd et al. | 709/224 |
| 8,340,024 B2* | 12/2012 | Stephens | H04L 29/06 370/328 |
| 8,478,300 B2* | 7/2013 | Kuehnel et al. | 455/456.3 |
| 8,559,350 B2* | 10/2013 | Kuehnel et al. | 370/312 |
| 8,635,335 B2* | 1/2014 | Raleigh et al. | 709/224 |
| 8,670,350 B2* | 3/2014 | Page et al. | 370/255 |
| 8,681,353 B2* | 3/2014 | Ryu et al. | 358/1.15 |
| 8,738,780 B2 | 5/2014 | Gurun et al. | 709/227 |
| 8,751,644 B2 | 6/2014 | Bornhoevd et al. | 709/224 |
| 8,755,306 B1 | 6/2014 | Chhabra | 370/255 |
| 9,019,876 B2* | 4/2015 | Stephens | H04L 29/06 370/310.2 |
| 9,072,090 B2* | 6/2015 | Segev | H04W 72/044 |
| 2001/0003191 A1 | 6/2001 | Kovacs et al. | 709/226 |
| 2001/0029531 A1 | 10/2001 | Ohta | 709/223 |
| 2001/0048534 A1 | 12/2001 | Tanaka et al. | |
| 2002/0026492 A1 | 2/2002 | Fujita | 709/208 |
| 2002/0029277 A1 | 3/2002 | Simpson-Young et al. | 709/228 |
| 2002/0030840 A1* | 3/2002 | Itaki et al. | 358/1.13 |
| 2002/0032748 A1 | 3/2002 | Myojo | 709/217 |
| 2002/0041388 A1* | 4/2002 | Aoki | 358/1.14 |
| 2002/0046228 A1 | 4/2002 | Scheifler et al. | 709/1 |
| 2002/0048455 A1* | 4/2002 | Tamura et al. | 396/18 |
| 2002/0062407 A1* | 5/2002 | Tateyama et al. | 710/11 |
| 2002/0075229 A1 | 6/2002 | Ito et al. | 345/156 |
| 2002/0080250 A1 | 6/2002 | Ogawa et al. | 348/232 |
| 2002/0093682 A1 | 7/2002 | Nakajima | 358/1.16 |
| 2002/0097423 A1 | 7/2002 | Qiao | 358/1.14 |
| 2002/0105678 A1* | 8/2002 | Shiraiwa | 358/1.15 |
| 2002/0120750 A1 | 8/2002 | Nidd | |
| 2002/0138671 A1* | 9/2002 | Struble | 710/15 |
| 2002/0143855 A1 | 10/2002 | Traversat et al. | 709/202 |
| 2002/0143944 A1 | 10/2002 | Traversat et al. | 709/225 |
| 2002/0147771 A1 | 10/2002 | Traversat et al. | 709/203 |
| 2002/0147810 A1* | 10/2002 | Traversat et al. | 709/224 |
| 2002/0147819 A1* | 10/2002 | Miyakoshi et al. | 709/228 |
| 2002/0150092 A1 | 10/2002 | Bontempi et al. | 370/389 |
| 2002/0156875 A1 | 10/2002 | Pabla | 709/220 |
| 2002/0161740 A1 | 10/2002 | Nakamura et al. | 707/1 |
| 2002/0176366 A1* | 11/2002 | Ayyagari et al. | 370/245 |
| 2002/0180879 A1 | 12/2002 | Shiohara | 348/333.05 |
| 2002/0194417 A1* | 12/2002 | Suzuki et al. | 710/305 |
| 2003/0002073 A1 | 1/2003 | Berkema et al. | 358/1.15 |
| 2003/0003933 A1 | 1/2003 | Deshpande et al. | 455/510 |
| 2003/0007641 A1 | 1/2003 | Kinoshita | |
| 2003/0014446 A1 | 1/2003 | Simpson et al. | 707/527 |
| 2003/0016378 A1 | 1/2003 | Ozawa et al. | 358/1.13 |
| 2003/0041102 A1 | 2/2003 | Simpson et al. | 709/203 |
| 2003/0041141 A1* | 2/2003 | Abdelaziz et al. | 709/223 |
| 2003/0050963 A1 | 3/2003 | Lamming et al. | 709/203 |
| 2003/0053437 A1 | 3/2003 | Bahl et al. | 370/345 |
| 2003/0056133 A1 | 3/2003 | Talley | 713/323 |
| 2003/0060168 A1 | 3/2003 | Teibel | 455/69 |
| 2003/0078965 A1* | 4/2003 | Cocotis et al. | 709/203 |
| 2003/0081237 A1 | 5/2003 | Ogiwara et al. | 358/1.14 |
| 2003/0081251 A1 | 5/2003 | Tanaka et al. | 358/1.15 |
| 2003/0091015 A1* | 5/2003 | Gassho et al. | 370/338 |
| 2003/0095524 A1* | 5/2003 | Stephen | H04L 29/06 370/338 |
| 2003/0122932 A1 | 7/2003 | Shiohara | 348/207.2 |
| 2003/0122933 A1 | 7/2003 | Shiohara | 349/58 |
| 2003/0122934 A1 | 7/2003 | Shiohara | 348/207.2 |
| 2003/0122935 A1 | 7/2003 | Shiohara | 348/207.2 |
| 2003/0122993 A1 | 7/2003 | Eiraku et al. | 349/58 |
| 2003/0123840 A1 | 7/2003 | Fujinami | 386/35 |
| 2003/0142016 A1 | 7/2003 | Pickup | 342/387 |
| 2003/0156200 A1 | 8/2003 | Romano et al. | |
| 2003/0156567 A1* | 8/2003 | Oak | 370/338 |
| 2003/0185613 A1 | 10/2003 | Guddanti | 400/61 |
| 2003/0193895 A1* | 10/2003 | Engwer et al. | 370/241 |
| 2003/0208595 A1 | 11/2003 | Gouge et al. | 709/225 |
| 2004/0003060 A1* | 1/2004 | Asoh et al. | 709/220 |
| 2004/0008366 A1 | 1/2004 | Ferlitsch | 358/1.15 |
| 2004/0009769 A1* | 1/2004 | Yokoyama | 455/423 |
| 2004/0019671 A1 | 1/2004 | Metz | 709/223 |
| 2004/0021781 A1 | 2/2004 | Iida | 348/231.3 |
| 2004/0021902 A1 | 2/2004 | Ogiwara et al. | 358/1.15 |
| 2004/0039811 A1 | 2/2004 | Nakamura et al. | 709/223 |
| 2004/0044727 A1* | 3/2004 | Abdelaziz et al. | 709/203 |
| 2004/0063458 A1 | 4/2004 | Hori et al. | 455/554.2 |
| 2004/0095469 A1 | 5/2004 | Lin | 348/207.2 |
| 2004/0102192 A1 | 5/2004 | Serceki | 455/434 |
| 2004/0102977 A1 | 5/2004 | Metzler et al. | 704/275 |
| 2004/0137855 A1 | 7/2004 | Wiley et al. | 455/88 |
| 2004/0141083 A1 | 7/2004 | Takashima | 348/333.01 |
| 2004/0145769 A1* | 7/2004 | Collier | G06F 3/1205 358/1.15 |
| 2004/0150724 A1 | 8/2004 | Nozaki et al. | 348/211.4 |
| 2004/0167974 A1* | 8/2004 | Bunn | G06F 3/1204 709/223 |
| 2004/0169730 A1 | 9/2004 | Tamura et al. | 348/207.2 |
| 2004/0187157 A1 | 9/2004 | Chong et al. | 725/86 |
| 2004/0198319 A1* | 10/2004 | Whelan et al. | 455/411 |
| 2004/0203593 A1* | 10/2004 | Whelan et al. | 455/411 |
| 2004/0230671 A1* | 11/2004 | Rollins et al. | 709/220 |
| 2005/0001024 A1* | 1/2005 | Kusaka et al. | 235/375 |
| 2005/0007617 A1 | 1/2005 | Tanaka et al. | 358/1.13 |
| 2005/0044479 A1* | 2/2005 | Willams et al. | 715/500.1 |
| 2005/0046896 A1* | 3/2005 | Aoki | 358/1.15 |
| 2005/0066197 A1 | 3/2005 | Hirata et al. | |
| 2005/0122539 A1 | 6/2005 | Sugimoto | |
| 2005/0128968 A1 | 6/2005 | Yang | 370/312 |
| 2005/0130647 A1 | 6/2005 | Matsuda et al. | 455/426.2 |
| 2005/0148326 A1* | 7/2005 | Nogawa et al. | 455/420 |
| 2005/0152319 A1 | 7/2005 | Kubler et al. | 370/338 |
| 2005/0174357 A1 | 8/2005 | Wang | 345/581 |
| 2005/0177639 A1 | 8/2005 | Reunamäki et al. | 709/227 |
| 2005/0185205 A1 | 8/2005 | Eckhaus et al. | 358/1.13 |
| 2005/0198336 A1 | 9/2005 | Eytchison et al. | 709/230 |
| 2005/0216562 A1 | 9/2005 | Armstrong et al. | 709/206 |
| 2005/0270556 A1 | 12/2005 | Shimamura | 358/1.13 |
| 2005/0286075 A1* | 12/2005 | Ryu et al. | 358/1.15 |
| 2006/0002726 A1 | 1/2006 | Fukui | 399/49 |

(56) References Cited

U.S. PATENT DOCUMENTS

| | | | |
|---|---|---|---|
| 2006/0017956 A1 | 1/2006 | Shiohara | 358/1.13 |
| 2006/0023085 A1 | 2/2006 | Shiohara | 348/231.99 |
| 2006/0023086 A1 | 2/2006 | Shiohara | 348/231.99 |
| 2006/0023087 A1 | 2/2006 | Shiohara | 348/231.99 |
| 2006/0023088 A1 | 2/2006 | Shiohara | 348/231.99 |
| 2006/0023103 A1 | 2/2006 | Shiohara | 348/333.09 |
| 2006/0023104 A1 | 2/2006 | Shiohara | 348/333.11 |
| 2006/0025076 A1 | 2/2006 | Yu | 600/587 |
| 2006/0029360 A1 | 2/2006 | Shiohara | 386/46 |
| 2006/0029361 A1 | 2/2006 | Shiohara | 386/46 |
| 2006/0029362 A1 | 2/2006 | Shiohara | 386/46 |
| 2006/0033812 A1 | 2/2006 | Yoshida et al. | 348/14.01 |
| 2006/0045042 A1* | 3/2006 | Sethi et al. | 370/324 |
| 2006/0072016 A1 | 4/2006 | Shiohara | 348/207.2 |
| 2006/0077455 A1 | 4/2006 | Watanabe | 358/1.15 |
| 2006/0080423 A1* | 4/2006 | Brewer et al. | 709/223 |
| 2006/0105714 A1* | 5/2006 | Hall et al. | 455/41.3 |
| 2006/0111103 A1 | 5/2006 | Jeong et al. | 455/434 |
| 2006/0133414 A1 | 6/2006 | Luoma et al. | 370/466 |
| 2006/0164969 A1* | 7/2006 | Malik et al. | 370/203 |
| 2006/0176506 A1* | 8/2006 | Lin et al. | 358/1.15 |
| 2006/0178139 A1* | 8/2006 | Karaoguz et al. | 455/426.1 |
| 2006/0183477 A1 | 8/2006 | Bocking et al. | 455/435.2 |
| 2006/0197976 A1 | 9/2006 | Oka | |
| 2006/0200563 A1 | 9/2006 | Hirose | 709/227 |
| 2006/0200564 A1 | 9/2006 | Watanabe et al. | |
| 2006/0206592 A1 | 9/2006 | Fujii et al. | 709/220 |
| 2006/0212610 A1 | 9/2006 | Nago et al. | 710/16 |
| 2006/0212611 A1 | 9/2006 | Fujii et al. | 710/16 |
| 2006/0238636 A1 | 10/2006 | Shiohara | 348/333.01 |
| 2006/0239209 A1* | 10/2006 | Ayyagari et al. | 370/254 |
| 2006/0242304 A1 | 10/2006 | Hirose et al. | |
| 2006/0246946 A1* | 11/2006 | Moritomo et al. | 455/557 |
| 2006/0246947 A1 | 11/2006 | Fujii et al. | 455/557 |
| 2006/0252413 A1 | 11/2006 | Ikeda | 455/414.1 |
| 2006/0268744 A1 | 11/2006 | Sakai et al. | |
| 2007/0002867 A1 | 1/2007 | Shitano et al. | |
| 2007/0013781 A1 | 1/2007 | Kageyama et al. | |
| 2007/0030516 A1 | 2/2007 | Tsuji et al. | 358/1.15 |
| 2007/0053571 A1 | 3/2007 | Hayashi | 382/131 |
| 2007/0060213 A1 | 3/2007 | Yoshida | 455/574 |
| 2007/0097427 A1 | 5/2007 | Shiohara | 358/1.15 |
| 2007/0097442 A1 | 5/2007 | Shiohara | 358/3.21 |
| 2007/0115819 A1* | 5/2007 | Stephens | H04L 29/06 370/230 |
| 2007/0120955 A1 | 5/2007 | Shimasato | 348/14.01 |
| 2007/0141984 A1* | 6/2007 | Kuehnel et al. | 455/41.2 |
| 2007/0141986 A1* | 6/2007 | Kuehnel et al. | 455/41.2 |
| 2007/0141988 A1* | 6/2007 | Kuehnel et al. | 455/41.2 |
| 2007/0153317 A1 | 7/2007 | Klein | 358/1.15 |
| 2007/0195362 A1 | 8/2007 | Yamada et al. | 358/1.15 |
| 2007/0217332 A1 | 9/2007 | Nakahara | 370/229 |
| 2007/0220255 A1 | 9/2007 | Igarashi | 713/170 |
| 2007/0223046 A1 | 9/2007 | Shiraiwa | 358/296 |
| 2007/0223670 A1 | 9/2007 | Ido | 379/201.01 |
| 2007/0233834 A1 | 10/2007 | Hattori et al. | 709/223 |
| 2007/0253390 A1* | 11/2007 | Gassho et al. | 370/338 |
| 2007/0264991 A1* | 11/2007 | Jones et al. | 455/420 |
| 2007/0273898 A1 | 11/2007 | Toda | 358/1.6 |
| 2007/0275701 A1* | 11/2007 | Jonker | 455/414.1 |
| 2008/0051094 A1* | 2/2008 | Maki et al. | 455/445 |
| 2008/0068658 A1 | 3/2008 | Chen | 358/1.18 |
| 2008/0086760 A1* | 4/2008 | Jiang et al. | 726/3 |
| 2008/0123554 A1* | 5/2008 | Chhabra | 370/254 |
| 2008/0192121 A1 | 8/2008 | Hashimoto | 348/207.2 |
| 2008/0207129 A1* | 8/2008 | Page et al. | 455/41.3 |
| 2008/0247369 A1* | 10/2008 | Sethi et al. | 370/338 |
| 2009/0025081 A1 | 1/2009 | Quigley et al. | 726/21 |
| 2009/0029728 A1* | 1/2009 | Shen et al. | 455/507 |
| 2009/0049519 A1* | 2/2009 | Uno et al. | 726/3 |
| 2009/0177801 A1 | 7/2009 | Chambers, Jr. et al. | 709/250 |
| 2009/0179991 A1 | 7/2009 | Mohammad | 348/207.2 |
| 2009/0239469 A1* | 9/2009 | Rangarajan et al. | 455/41.2 |
| 2009/0241072 A1 | 9/2009 | Chaudhri et al. | 715/863 |
| 2009/0248849 A1 | 10/2009 | Ishimoto | 709/223 |
| 2009/0284607 A1 | 11/2009 | Shiohara | 348/207.2 |
| 2009/0323108 A1 | 12/2009 | Shimma | 358/1.15 |
| 2010/0165402 A1* | 7/2010 | Karaoguz et al. | 358/1.15 |
| 2010/0183025 A1* | 7/2010 | Stephens | H04L 29/06 370/466 |
| 2010/0254286 A1* | 10/2010 | Rangarajan et al. | 370/254 |
| 2010/0271492 A1 | 10/2010 | Gyotoku | 348/207.2 |
| 2010/0277601 A1 | 11/2010 | Shiohara | 348/207.2 |
| 2010/0278077 A1 | 11/2010 | Reunamäki et al. | 370/254 |
| 2011/0009135 A1* | 1/2011 | Roskowski et al. | 455/500 |
| 2011/0029680 A1* | 2/2011 | Goto | 709/228 |
| 2011/0082909 A1 | 4/2011 | Ishibashi | 709/217 |
| 2011/0263251 A1* | 10/2011 | Chen | 455/434 |
| 2011/0320588 A1* | 12/2011 | Raleigh | 709/224 |
| 2012/0045993 A1* | 2/2012 | Page et al. | 455/41.2 |
| 2012/0069386 A1* | 3/2012 | St. Laurent et al. | 358/1.15 |
| 2012/0270587 A1 | 10/2012 | Watanabe et al. | 455/509 |
| 2012/0297055 A9* | 11/2012 | Raleigh | 709/224 |
| 2013/0028152 A1* | 1/2013 | Kim et al. | 370/310 |
| 2013/0107076 A1 | 5/2013 | Shiohara | 348/223.1 |
| 2013/0111044 A1* | 5/2013 | Cherian et al. | 709/228 |
| 2013/0137374 A1* | 5/2013 | Stephens | H04L 29/06 455/41.2 |
| 2013/0183998 A1* | 7/2013 | Pylappan et al. | 455/456.1 |
| 2013/0235813 A1* | 9/2013 | Segev et al. | 370/329 |
| 2014/0133297 A1* | 5/2014 | Raleigh et al. | 370/230 |

FOREIGN PATENT DOCUMENTS

| | | |
|---|---|---|
| EP | 1 117 221 A2 | 7/2001 |
| EP | 1117221 A2 | 7/2001 |
| EP | 1 133 208 A2 | 9/2001 |
| EP | 1 229 724 A2 | 8/2002 |
| EP | 1 241 838 A2 | 9/2002 |
| GB | 2 159 373 A | 11/1985 |
| GB | 2 354 832 | 4/2001 |
| JP | 04-150365 A | 5/1992 |
| JP | 07-303105 A | 11/1995 |
| JP | 10-248088 A | 9/1998 |
| JP | 10-341303 A | 12/1998 |
| JP | 11-008625 A | 1/1999 |
| JP | 11-239312 | 8/1999 |
| JP | 2000-148637 A | 5/2000 |
| JP | 2001-144767 A | 5/2001 |
| JP | 2002-57672 A | 2/2002 |
| JP | 2002-94531 | 3/2002 |
| JP | 2002-094604 A | 3/2002 |
| JP | 2002-159053 A | 5/2002 |
| JP | 2002-185462 A | 6/2002 |
| JP | 2002-234232 A | 8/2002 |
| JP | 2002-244829 A | 8/2002 |
| JP | 2002-314548 A | 10/2002 |
| JP | 2002-330142 A | 11/2002 |
| JP | 2002-344458 | 11/2002 |
| JP | 2002-345027 A | 11/2002 |
| JP | 2002-351766 A | 12/2002 |
| JP | 2002-373130 A | 12/2002 |
| JP | 2003-018148 A | 1/2003 |
| JP | 2003-050677 A | 2/2003 |
| JP | 2003-085548 | 3/2003 |
| JP | 2003-091467 A | 3/2003 |
| JP | 2003-152735 A | 5/2003 |
| JP | 2004-110844 | 4/2004 |
| JP | 2004-511188 A | 4/2004 |
| JP | 2004-229237 A | 8/2004 |
| JP | 2004-328289 A | 11/2004 |
| KR | 1989-0001306 A | 3/1989 |
| WO | 01/37497 A1 | 5/2001 |
| WO | 01/93514 | 12/2001 |
| WO | 01/93514 A1 | 12/2001 |
| WO | 02/31793 A2 | 4/2002 |
| WO | 2004/095778 A1 | 11/2004 |
| WO | 2004/098128 A1 | 11/2004 |
| WO | 2007/007758 | 1/2007 |

OTHER PUBLICATIONS

Eastman Kodak Company, "Kodak EasyShare-One zoom digital camera User's guide," 2005, 126 pages.

(56) References Cited

OTHER PUBLICATIONS

Corcoran et al., "Wireless Transfer of Images From a Digital Camera to the Internet Via a GSM Mobile Phone," IEEE Transactions on Consumer Electronics, vol. 47, No. 3, Aug. 1, 1001, pp. 542-547, New York, USA.

"The Windows XP Wireless Zero Configuration Service," Microsoft Corporation, Nov. 2002 (available at http://technet.microsoft.com/en-us/library/bb878124.aspx).

Mango, "Guide to Bluetooth Mobile Phone," China Academic Journal Electronic Publishing House, China, 2002. (An English translation thereof has been attached.).

Japanese Office Action dated Nov. 2, 2007, regarding Application No. 2003-118834 (with English translation).

Japanese Office Action dated Oct. 26, 2007, regarding Application No. 2003-119052.

Chinese Office Action dated Mar. 9, 2007, issued in counterpart application No. 2004-800107431.

Korean Office Action, dated Oct. 30, 2006 issued in related Korean Application.

Digital Photography Review, "Direct Print Standard (DPS)" (http://www.dpreview.com/news/0212/02120101dps.asp), Dec. 2, 2002, Digital Photography Review, pp. 1 and 2.

Camera and Imaging Products Association, "PictBridge Overview" (http://www.cipa.jp/pictbridge/contents_e/01pictbridge1_1_e.html), Nov. 21, 2003, CIPA, p. 1.

Camera and Imaging Products Association, "PictBridge Direct-Printing Functions and Features" (http://www.cipa.jp/pictbridge/contents_e/01pictbridge 1_2_e.html), Oct. 5, 2003, CIPA, pp. 1-2.

Digital Camera Review Online, "PictBridge Technology and Digital Cameras" (http://www.digital-cameras-review-online.com/pictbridge.html), Oct. 23, 2004, Digital Camera Review Online, pp. 1-7.

U.S. Appl. No. 13/541,190; Notice of Allowance dated Jun. 5, 2015.

* cited by examiner

FIG. 7

| NG | STA102 WIRELESS NETWORK ADDRESS |
|---|---|
|  | STA103 WIRELESS NETWORK ADDRESS |
|  | STA104 WIRELESS NETWORK ADDRESS |
| — | -------------- |
| — | -------------- |
| — | — |
| — | — |

FIG. 8

| | |
|---|---|
| NG | STA102 WIRELESS NETWORK ADDRESS |
| NG | STA103 WIRELESS NETWORK ADDRESS |
| | STA104 WIRELESS NETWORK ADDRESS |
| — | - - - - - - - - - - - - - |
| — | - - - - - - - - - - - - - |
| — | — |
| — | — |

INFORMATION PROCESSING APPARATUS AND CONNECTION CONTROL METHOD FOR SEARCHING FOR A PRINTER HAVING A PREDETERMINED FUNCTION IDENTIFIED BY IDENTIFICATION INFORMATION INCLUDED IN A BEACON SIGNAL AND SENDING A PRINT REQUEST DIRECTLY TO THE PRINTER WHICH IS OPERATING AS AN ACCESS POINT WITHOUT GOING THROUGH AN EXTERNAL ACCESS POINT

CROSS REFERENCE TO RELATED APPLICATIONS

This application is a continuation of U.S. application Ser. No. 10/551,174 filed Sep. 29, 2005, which is a 371 national stage of International Application No. PCT/JP2004/005233 filed on Apr. 13, 2004, which claims priority under 35 U.S.C. §119 of Japanese Application No. 2003-118839 filed on Apr. 23, 2003, the entire disclosures of which are hereby incorporated by reference herein.

TECHNICAL FIELD

The present invention relates to a technique of wirelessly connecting an information processing apparatus to other information processing apparatuses in a plurality of wireless networks.

BACKGROUND ART

Information storage terminals such as a digital camera and information output apparatuses such as a printer are conventionally peripheral devices for personal computers (PCs). Data of such peripheral device is loaded to a PC, processed, and then output.

However, not everyone can handle a PC, so a "direct print" method of directly connecting a digital camera and printer via a cable to print is proposed (see, e.g., Japanese Patent Laid-Open No. 11-239312).

In recent years, wireless LANs defined by IEEE 802.11 has spread. The wireless LAN can wirelessly connect a computer and network at high speed.

In this situation, the direct print method also requires wireless connection instead of cumbersome cable connection. Wireless connection by a wireless LAN defined by IEEE 802.11 has become popular and can be implemented at relatively low cost. Wireless connection can connect a peripheral device and digital camera, and can also easily connect a digital camera to the Internet.

When the IEEE 802.11 wireless LAN is applied to a computer, the user can designate a wireless network to be connected by using its identifier. For a user who uses direct printing, wireless connection by simple operation is desirable because the operation unit of a digital camera or printer has poor operability.

Several parameters must be essentially set for wireless connection. The IEEE 802.11 wireless LAN can establish wireless connection by receiving a wireless network identifier contained in a beacon frame periodically transmitted from an access point, and using the received wireless network identifier for wireless connection, without setting any parameter. The wireless LAN enables the user to attain wireless connection without any special operation.

However, wireless connection suffers the following problems:

(1) A direct print type printer does not always exist in a connected wireless network; and (2) In order to solve problem (1), the user may be prompted to input various pieces of information or perform various operations. However, a wireless connection cannot be realized by simple operation.

DISCLOSURE OF INVENTION

The present invention has been made to overcome the conventional drawbacks, and has as its object to wirelessly connect an information processing apparatus having a function of performing predetermined processing.

To achieve the above object, according to one aspect of the present invention, it is provided that a connection control method for an information processing apparatus, comprising: a step of receiving identification information for identifying each network out of a plurality of wireless networks; a step of wirelessly connecting a wireless network identified by arbitrary identification information; a step of inquiring, of other information processing apparatuses in the wirelessly connected wireless network, whether the other information processing apparatuses have a function of performing predetermined processing; and a step of controlling connection to one of the other information processing apparatuses in accordance with a response to the inquiry, wherein the information processing apparatus causes the connected one of the other information processing apparatuses to perform the predetermined processing.

According to another aspect, it is provided that an information processing apparatus comprising: means for receiving identification information for identifying each network out of a plurality of wireless networks; means for wirelessly connecting a wireless network identified by arbitrary identification information; means for inquiring, of other information processing apparatuses in the wirelessly connected wireless network, whether the other information processing apparatuses have a function of performing predetermined processing; and means for controlling connection to one of the other information processing apparatuses in accordance with a response to the inquiry, wherein the information processing apparatus causes the connected one of the other information processing apparatuses to perform the predetermined processing.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 7 is a table showing an OK message reception list according to the second embodiment;

FIG. 8 is a table showing a state in which the OK message reception list shown in FIG. 7 is updated;

BEST MODE FOR CARRYING OUT THE INVENTION

Preferred embodiments of the present invention will be described in detail below with reference to the accompanying drawings.

First Embodiment

A case wherein wireless direct printing is performed by a wireless direct print type digital camera (to be referred to as a WDSC hereinafter) and a wireless direct print type printer (to be referred to as a WPTR hereinafter) will be described as the first embodiment. In this embodiment, the wireless standard is a wireless LAN, and the WDSC and WPTR operate as stations (to be referred to as STAs hereinafter). The communication mode is an infrastructure mode defined by IEEE 802.11.

Figure 1:
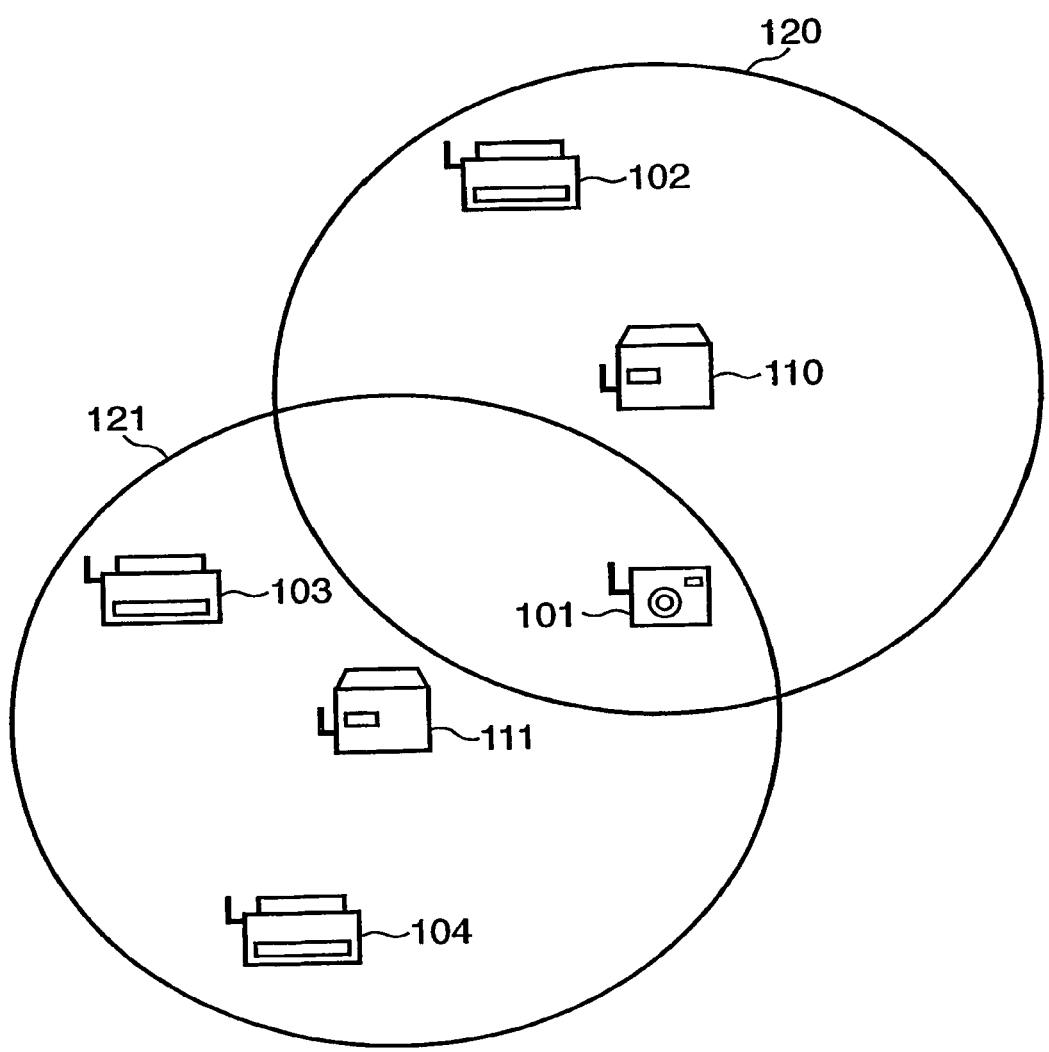
FIG. 1 is a view showing the arrangement of a wireless LAN system according to the first embodiment.

FIG. 1 is a view showing the arrangement of a wireless LAN system according to the first embodiment. In the system shown in FIG. 1, the wireless LAN has two access points (to be hereinafter referred to as APs), i.e., APs 110 and 111. The APs 110 and 111 have wireless areas 120 and 121, respectively, and can wirelessly communicate with STAs within the areas. That is, the AP 110 communicates with an STA 102 serving as a WPTR, whereas the AP 111 communicates with STAs 103 and 104 serving as WPTRs. The WDSC is illustrated as an STA 101 in the example shown in FIG. 1, and exists within the wireless areas of the APs 110 and 111.

In the first embodiment, the printer suffices to be one corresponding to IEEE 802.11 wireless direct printing, and a detailed description thereof will be omitted.

The arrangement and operation of a wireless direct print type digital camera which wirelessly connects the WPTR by simple operation will be explained.

Figure 2:
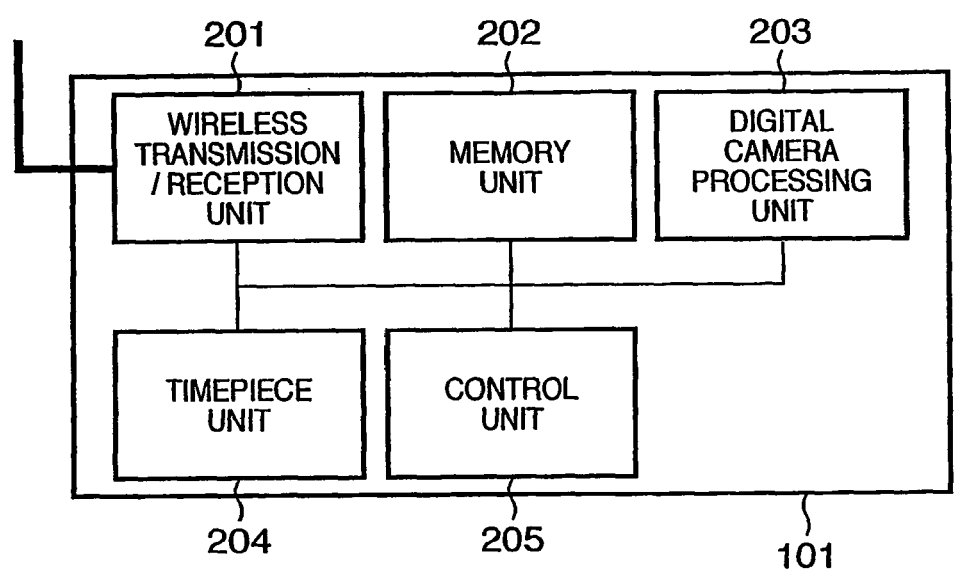
FIG. 2 is a block diagram showing the functional arrangement of a wireless communication digital camera.

FIG. 2 is a block diagram showing the functional arrangement of a wireless communication digital camera. In FIG. 2, reference numeral 201 denotes a wireless transmission/reception unit which modulates a digital signal to be transmitted in order to wirelessly transmit it, converts the modulated transmission data into a wireless transmittable form to transmit the data to an antenna, extracts modulated data from information wirelessly received from the antenna, detects the received signal, and converts the signal into a digital signal. Reference numeral 202 denotes a memory unit which stores a video signal sensed by a digital camera processing unit (to be described below), setting information, and the like.

Reference numeral 203 denotes a digital camera processing unit which includes an image sensing unit for converting an image of an object optically sensed by a CCD into an electrical signal and outputting the electrical signal, and performs predetermined processing for a video signal output from the image sensing unit. Reference numeral 204 denotes a timepiece unit which counts various setting times by a programmable timer. Reference numeral 205 denotes a control unit including a CPU which controls the overall digital camera in accordance with a program (to be described later), a ROM which stores the program and control data of the CPU, and a RAM which defines a work area, various tables, and the like used to execute processing by the CPU.

Processing in the first embodiment will be explained in which in order to print by direct printing from the WDSC (STA 101 shown in FIG. 1), a wireless link is established, and then a print processing request is issued to a WPTR which has responded to a print function inquiry.

Figure 3:
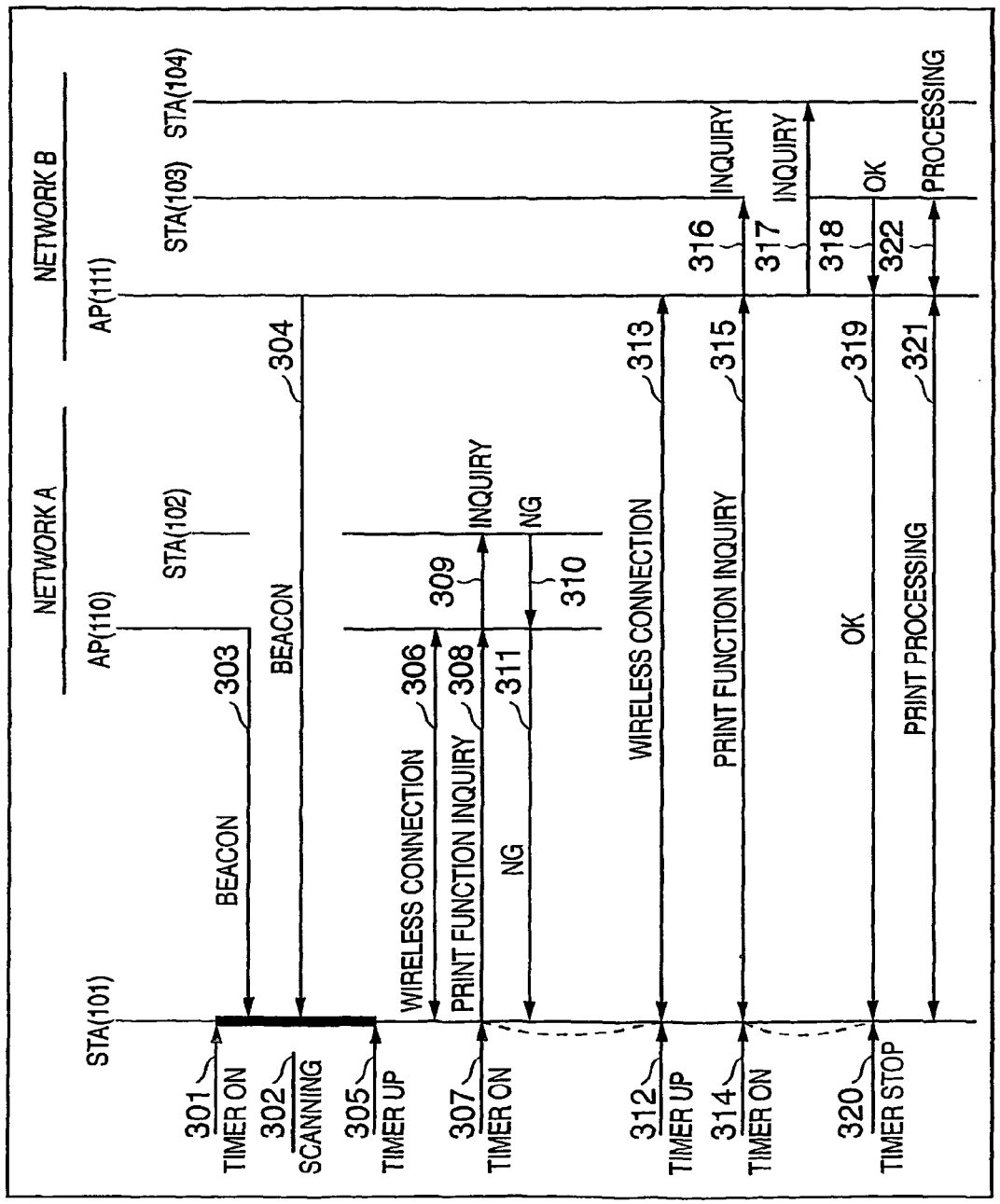
FIG. 3 is a chart showing a sequence according to the first embodiment.
Figure 4:
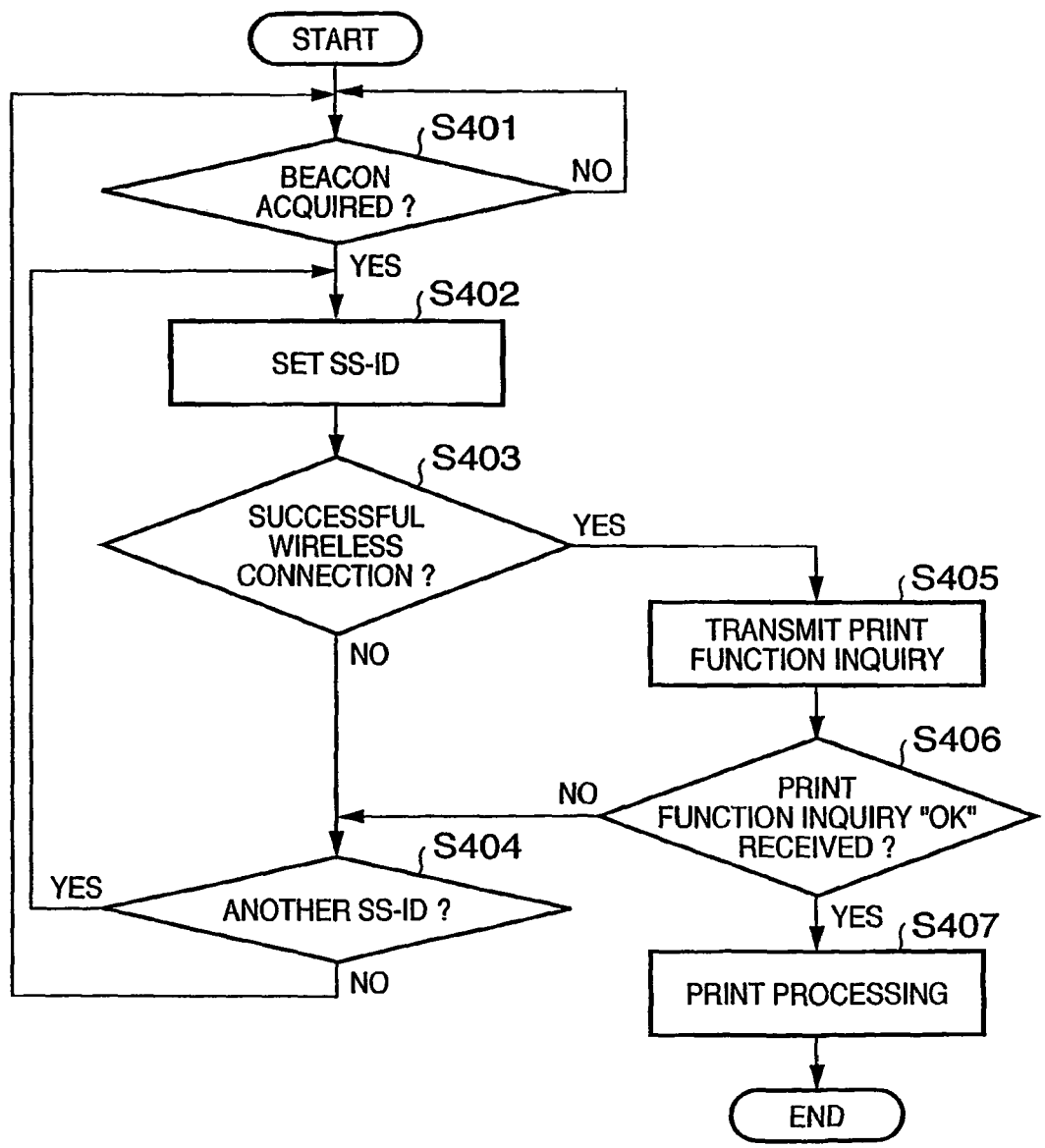
FIG. 4 is a flow chart showing processing by a WDSC according to the first embodiment.

FIG. 3 is a chart showing a sequence according to the first embodiment. FIG. 4 is a flow chart showing processing by the WDSC according to the first embodiment.

The control unit 205 of the STA 101 serving as a WDSC set in the infrastructure mode activates the beacon reception timer of the timepiece unit 204 (301). The control unit 205 performs scanning (302), and receives beacon signals (303 and 304) sent from the APs 110 and 111 until the beacon reception timer reaches the expiration time (305) (S401). An SSID (Service Set IDentifier) which is contained in the received beacon signal and set to identify an access point (network) is read, and the read SSID is stored in the memory unit 202 and set in the control unit 205 (S402). Wireless connection (306) is established via the wireless transmission/reception unit 201. In this case, the first received SSID of the AP 110 is set.

If wireless connection to the AP 110 fails (NO in S403), whether another SSID exists in the memory unit 202 is confirmed (S404). If another SSID exists (YES in S404), the SSID is set in the control unit 205 (S402). If no SSID can be confirmed (NO in S404), the flow returns to step S401 to receive a beacon signal again. Before the next reception, a non-service-area timer may be activated to set a reception interval.

If wireless connection is successful (YES in S403), a print function inquiry message (308 and 309) which inquires whether an STA corresponds to direct printing is transmitted to all STAs (STA 102 shown in FIG. 1) in the network identified by the set SSID (S405). The response time timer of the timepiece unit 204 is activated (307). In this case, an NG message (310 and 311) is received from the STA 102 serving as a WPTR because of a different direct print version.

When the STA is not a WPTR (i.e., the STA does not correspond to wireless direct printing), unlike the first embodiment, no response can be expected, and processing waits for the response time of the response time timer, and if no response is received, an NG message is assumed to be received.

If the response time timer reaches the expiration time (312), reception of a response message to the print function inquiry message stops (NO in S406), and the flow shifts to the next processing. That is, the control unit 205 determines that the presence of a WPTR which satisfies the STA 101 serving as a WDSC cannot be confirmed. A list of SSIDs stored in the memory unit 202 is referred to (YES in S404), the SSID of the next AP 111 is set in the control unit 205 (S402), and wireless connection (313) is performed.

If wireless connection is successful (YES in S403), a print function inquiry message (315, 316, and 317) is similarly transmitted to all STAs (STAs 103 and 104 shown in FIG. 1) in the network (S405), and the response time timer of the timepiece unit 204 is activated (314).

Thereafter, if an OK message (318 and 319) is received from the STA 103 serving as a WPTR (YES in S406), the control unit 205 stops the response time timer (320). In response to this, after the STA 103 transmits the OK message, even if the STA 104 transmits a response message, the STA 101 does not receive it.

The STA 101 which has received the OK message (318 and 319) from the STA 103 serving as a WPTR transmits a print request to the STA 103, and performs print processing (321 and 322) (S407).

In this manner, the WDSC can be connected to the WPTR having the direct print function, and execute print processing by direct printing.

Wireless direct printing has been explained using a wireless LAN as a wireless method, but can cope with various wireless methods.

Second Embodiment

The second embodiment according to the present invention will be described in detail below with reference to the accompanying drawings.

In the first embodiment, a print processing request is issued to a WPTR which has first sent back an "OK message" in response to a print function inquiry when wireless direct printing is performed by a wireless direct print type printer (WPTR) from a wireless direct print type digital camera (WDSC). In the second embodiment, a list of WPTRs which have sent back "OK messages" is created and registered in advance, a desired WPTR is selected, and a print processing request is issued to it.

The arrangement of a wireless LAN system according to the second embodiment is the same as that according to the first embodiment shown in FIG. 1, and a description thereof will be omitted. Similar to the first embodiment, the wireless standard is a wireless LAN, and the WDSC and WPTR operate as STAs.

The arrangement of a wireless direct print type digital camera (WDSC) is also the same as that in the first embodiment shown in FIG. 2, and a description thereof will be omitted.

Processing in the second embodiment will be explained in which in order to print by direct printing from a WDSC (STA 101 shown in FIG. 1), a wireless link is established, a list of WPTRs which have responded to a print function inquiry is created and registered, and a print processing request is issued to a desired WPTR. This processing also includes processing of issuing a print processing request to another WPTR in the registered list when print processing does not normally end.

Figure 5:
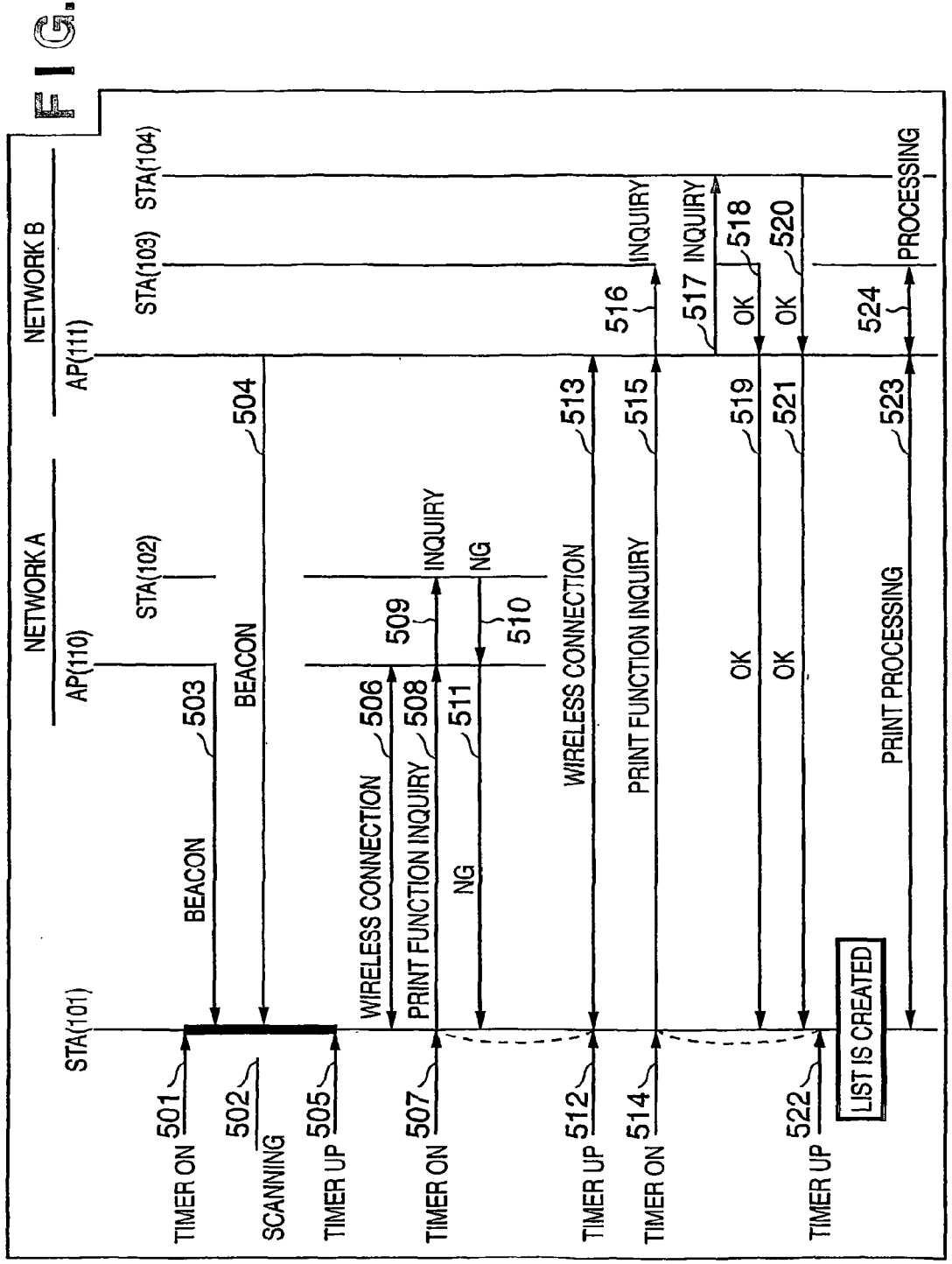
FIG. 5 is a chart showing a sequence according to the second embodiment.
Figure 6:
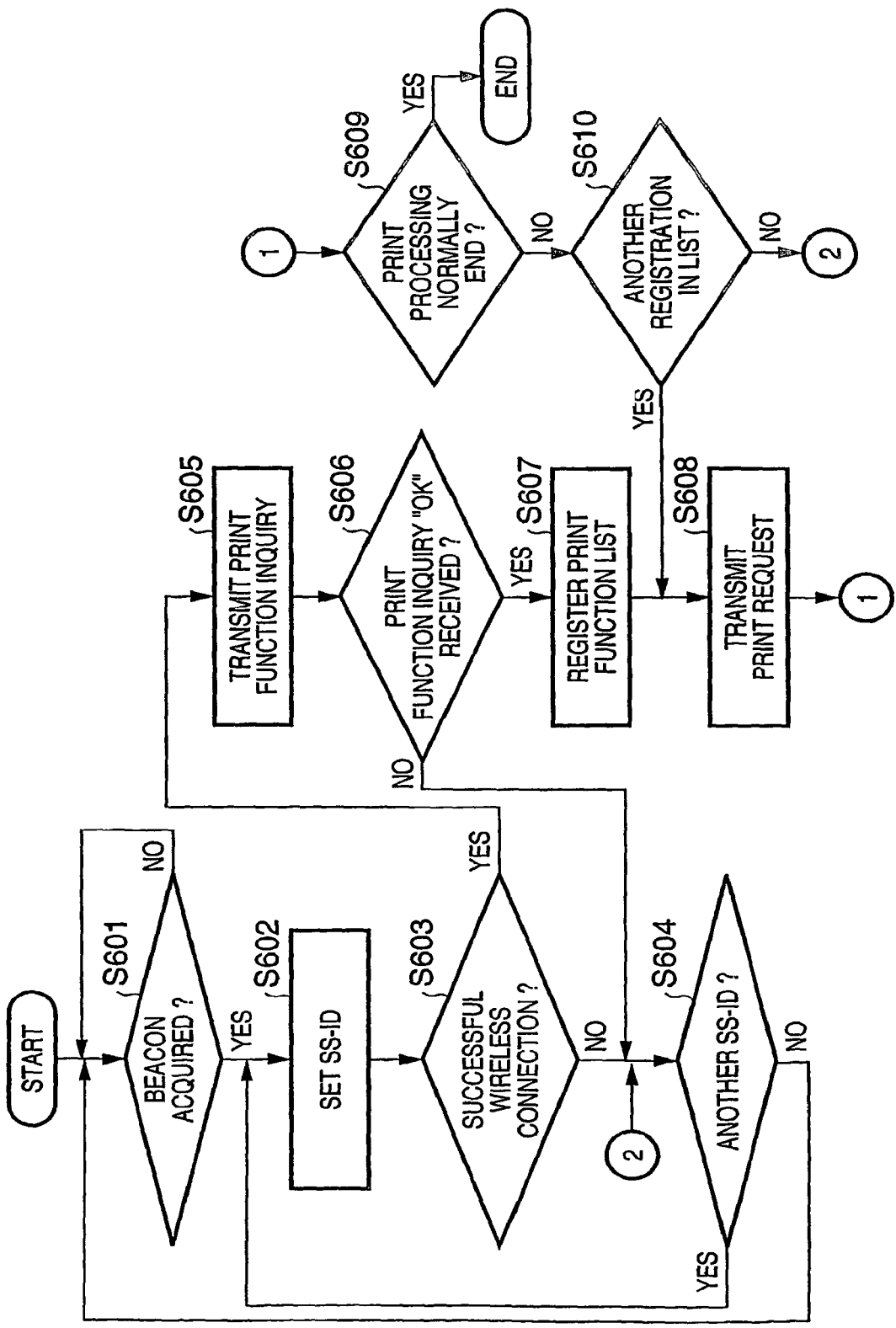
FIG. 6 is a flow chart showing processing by a WDSC according to the second embodiment.

FIG. 5 is a chart showing a sequence according to the second embodiment. FIG. 6 is a flow chart showing processing by the WDSC according to the second embodiment.

A control unit 205 of the STA 101 serving as a WDSC activates the beacon reception timer of a timepiece unit 204 (501). The control unit 205 performs scanning (502), and receives beacon signals (503 and 504) sent from APs 110 and 111 until the beacon reception timer reaches the expiration time (505) (S601). An SSID which is contained in the received beacon signal and set to identify a network is read, and the read SSID is stored in a memory unit 202 and set in the control unit 205 (S602). Wireless connection (506) is established via a wireless transmission/reception unit 201. In this case, the first received SSID of the AP 110 is set.

If wireless connection to the AP 110 fails (NO in S603), whether another SSID exists in the memory unit 202 is confirmed. If another SSID exists (YES in S604), the SSID is set in the control unit 205 (S602). If no SSID can be confirmed (NO in S604), the flow returns to step S601 to receive a beacon signal again. Before the next reception, a non-service-area timer may be activated to set a reception interval.

If wireless connection is successful (YES in S603), a print function inquiry message (508 and 509) which inquires whether an STA corresponds to direct printing is transmitted to all STAs (STA 102 shown in FIG. 1) in the network identified by the set SSID (S605). The response time timer of the timepiece unit 204 is activated (507). In this case, an NG message (510 and 511) is received from the STA 102 serving as a WPTR because of a different direct print version.

When the STA is not a WPTR, unlike the second embodiment, no response can be expected, and processing waits for the response time of the response time timer, and if no response is received, an NG message is assumed to be received.

If the response time timer reaches the expiration time (512), reception of a response message to the print function inquiry message stops (NO in S606), and the flow shifts to the next processing. That is, the control unit 205 determines that the presence of a WPTR which satisfies the STA 101 serving as a WDSC cannot be confirmed. A list of SSIDs stored in the memory unit 202 is referred to (YES in S604), the SSID of the next AP 111 is set in the control unit 205 (S602), and wireless connection (513) is performed.

If wireless connection is successful (YES in S603), a print function inquiry message (515, 516, and 517) is similarly transmitted to all STAs (STAs 103 and 104 shown in FIG. 1) in the network (S605), and the response time timer of the timepiece unit 204 is activated (514).

If OK messages (518, 519, 520, and 521) are received from the STAs 103 and 104 serving as WPTRs (YES in S606), the control unit 205 stops the response time timer upon the lapse of a predetermined time (522). The control unit 205 writes, in the OK message reception list, the network addresses of the STAs 103 and 104 from which the OK messages have been received, as shown in FIG. 7, and registers the list in the memory unit 202 (S607).

By referring to the OK message reception list registered in the memory unit 202, a print processing request is transmitted to the network address of the STA 103 (523, 524) whose OK message has first been received by the STA 101 serving as a WDSC (S608). If printing does not normally end (NO in S609), the control unit 205 refers again to the OK message reception list registered in the memory unit 202 (S610), and writes "NG" in the column for the network address of the STA 103, as shown in FIG. 8. The control unit 205 transmits a print processing request to the network address of the STA 104 to which no "NG" is assigned (S608). If print processing normally ends (YES in S609), the processing ends. At this time, the OK message reception list may be cleared.

As described above, the WDSC can be connected to the WPTR having the direct print function, and execute print processing by direct printing.

Wireless direct printing has been explained using a wireless LAN as a wireless method, but can cope with various wireless methods.

Third Embodiment

The third embodiment according to the present invention will be described in detail below with reference to the accompanying drawings.

In the first and second embodiments, wireless direct printing is performed by a wireless direct print type printer (WPTR) from a wireless direct print type digital camera (WDSC) via an access point. In the third embodiment, wireless direct printing is done by a wireless direct print type printer having an access point function.

Figure 9:
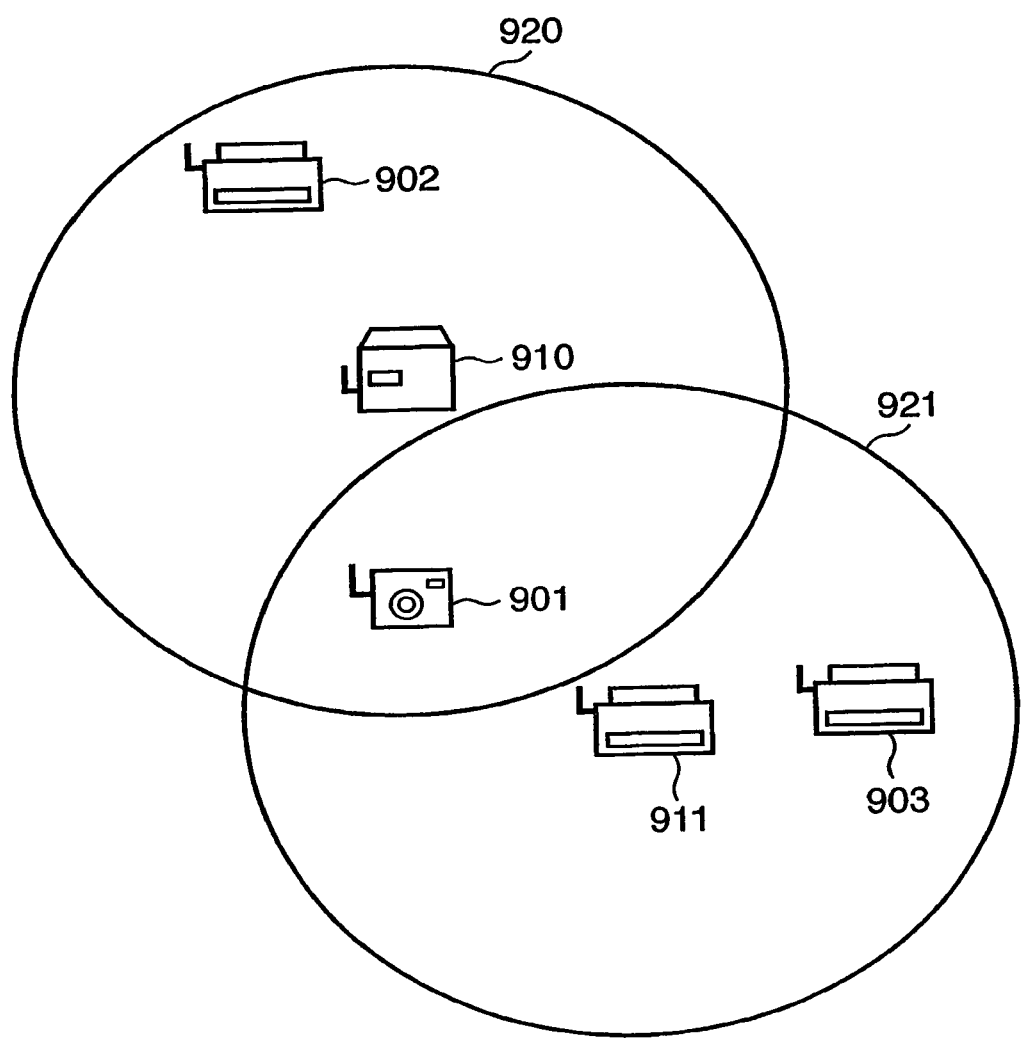
FIG. 9 is a view showing the arrangement of a wireless LAN system according to the third embodiment.

FIG. 9 is a view showing the arrangement of a wireless LAN system according to the third embodiment. In the system shown in FIG. 9, the wireless LAN has two access points (APs), i.e., APs 910 and 911. The APs 910 and 911 have wireless areas 920 and 921, respectively, and can wirelessly communicate with STAs within the areas. That is, the AP 910 communicates with an STA 902 serving as a WPTR, whereas the AP 911 communicates with an STA 903 serving as a WPTR with the access point function. The WDSC is illustrated as an STA 901 in the example shown in FIG. 9, and exists within the wireless areas of the APs 910 and 911. The communication mode is an infrastructure mode defined by IEEE 802.11.

The WPTR having the access point function may be a known one, and a detailed description thereof will be omitted.

The arrangement of the wireless direct print type digital camera (WDSC) is the same as that according to the first and second embodiments shown in FIG. 2, and a description thereof will be omitted.

Processing in the third embodiment will be explained in which in order to print by direct printing from the WDSC (STA 901 shown in FIG. 9), a wireless link is established, and then a print processing request is issued to the AP 911 serving as a WPTR which has responded to a print function inquiry.

Figure 10:
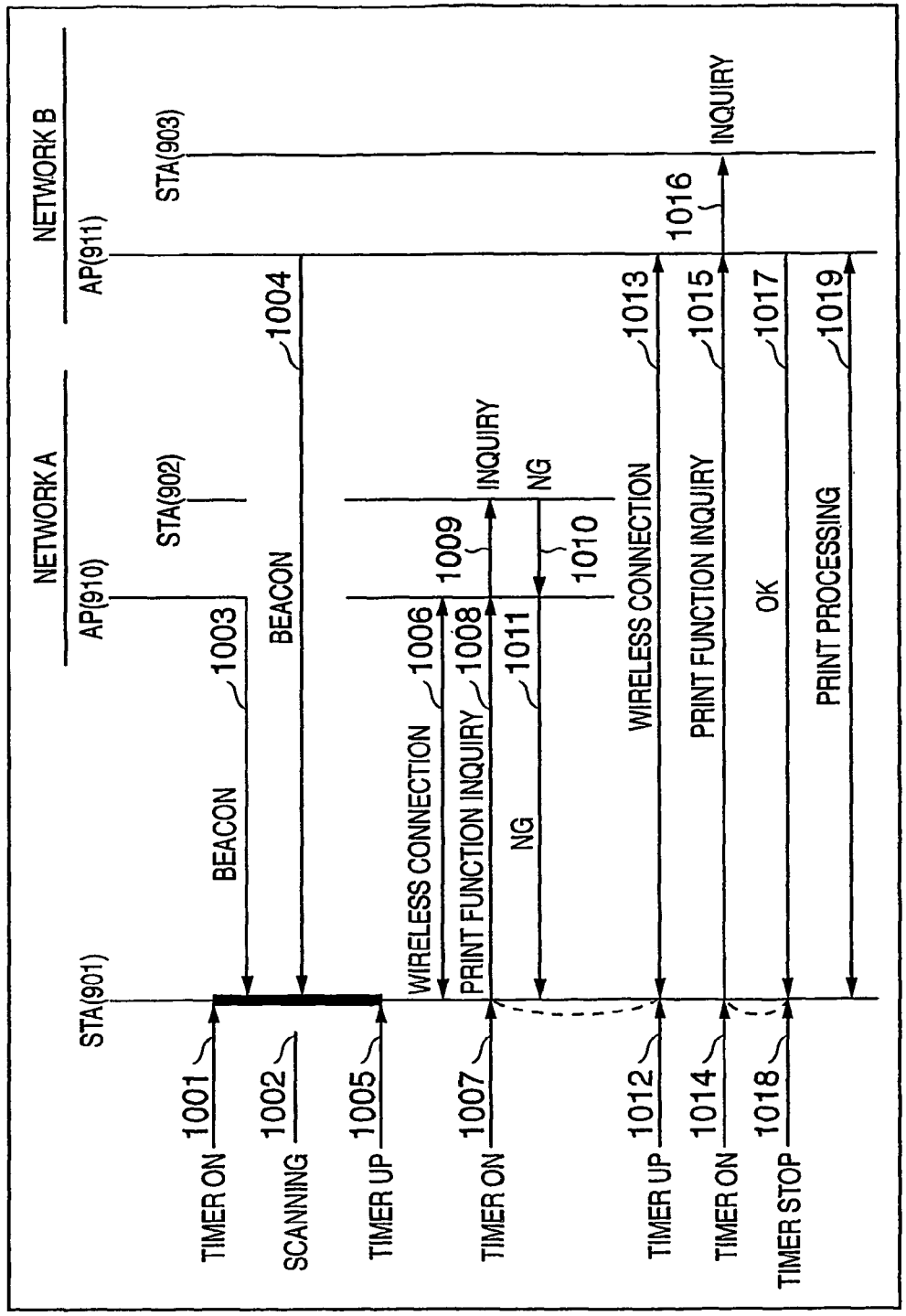
FIG. 10 is a chart showing a sequence according to the third embodiment.

FIG. 10 is a chart showing a sequence according to the third embodiment. Processing by the WDSC in the third embodiment is the same as the flow chart shown in FIG. 4, and will be described with reference to FIG. 4.

A control unit 205 of the STA 901 serving as a WDSC activates the beacon reception timer of a timepiece unit 204 (1001). The control unit 205 performs scanning (1002), and receives beacon signals (1003 and 1004) sent from the APs 910 and 911 until the beacon reception timer reaches the expiration time (1005) (S401). An SSID which is contained in the received beacon signal and set to identify a network is read, and the read SSID is stored in a memory unit 202 and set in the control unit 205 (S402). Wireless connection (1006) is established via a wireless transmission/reception unit 201. In this case, the first received SSID of the AP 910 is set.

If wireless connection to the AP 910 fails (NO in S403), whether another SSID exists in the memory unit 202 is confirmed. If another SSID exists (YES in S404), the SSID is set in the control unit 205 (S402). If no SSID can be confirmed (NO in S404), the flow returns to step S401 to receive a beacon signal again. Before the next reception, a non-service-area timer may be activated to set a reception interval.

If wireless connection is successful (YES in S403), a print function inquiry message (1008 and 1009) which inquires whether an STA corresponds to direct printing is transmitted to all STAs (STA 902 shown in FIG. 9) in the network identified by the set SSID (S405). The response time timer of the timepiece unit 204 is activated (1007). In this case, an NG message (1010 and 1011) is received from the STA 902 serving as a WPTR because of a different direct print version.

When the STA is not a WPTR, unlike the third embodiment, no response can be expected, and processing waits for the response time of the response time timer, and if no response is received, an NG message is assumed to be received.

If the response time timer reaches the expiration time (1012), reception of a response message to the print function inquiry message stops (NO in S406), and the flow shifts to the next processing. That is, the control unit 205 determines that the presence of a WPTR which satisfies the STA 901 serving as a WDSC cannot be confirmed. A list of SSIDs stored in the memory unit 202 is referred to (YES in S404), the SSID of the next AP 911 is set in the control unit 205 (S402), and wireless connection (1013) is performed.

If wireless connection is successful (YES in S403), a print function inquiry message (1015 and 1016) is similarly transmitted to all STAs (STA 903 shown in FIG. 9) in the network (S405), and the response time timer of the timepiece unit 204 is activated (1014).

If an OK message (1017) is received from the AP 911 serving as a WPTR (YES in S406), the control unit 205 stops the response time timer (1018). Accordingly, even if the STA 903 transmits a response message, the STA 901 does not receive it.

The STA 901 which has received the OK message (1017) from the AP 911 serving as a WPTR transmits a print request to the AP 911, and performs print processing (1019) (S407).

In this fashion, the WDSC can be connected to the WPTR having the direct print function, and execute print processing by direct printing.

Wireless direct printing has been explained using a wireless LAN as a wireless method, but can cope with various wireless methods.

In the first to third embodiments, direct printing is realized in an infrastructure mode defined by IEEE 802.11. Direct printing can also be realized using an ad-hoc mode defined by IEEE 802.11.

In this case, the STA 101 serving as a WDSC receives a beacon signal transmitted by an apparatus set in the ad-hoc mode, and reads an SSID. The STA 101 is directly wirelessly connected to the apparatus which has transmitted a beacon signal having this SSID, and inquires by a print function inquiry message whether the apparatus corresponds to direct printing. If the apparatus does not correspond to direct printing, the STA 101 sets another SSID; if the apparatus corresponds to it, requests the apparatus to print, thereby printing.

As described above, according to the above embodiments, the digital camera inquires the presence/absence of the direct print function of printers within a wireless network. If no compatible printer exists, the network is automatically switched, and the digital camera searches for a compatible network in the switched network. Even when a plurality of direct print type printers exist, a print request can be transmitted to a printer exhibiting the highest response speed.

The user of the digital camera can access a network including a direct print type printer, and realize direct printing by only simple operation.

The present invention may be applied to a system including a plurality of devices (e.g., a host computer, interface device, reader, and printer) or an apparatus (e.g., a copying machine or facsimile apparatus) formed from a single device.

The object of the present invention is also achieved when a recording medium which records software program codes for realizing the functions of the above-described embodiments is supplied to a system or apparatus, and the computer (or the CPU or MPU) of the system or apparatus reads out and executes the program codes recorded on the recording medium.

In this case, the program codes read out from the recording medium realize the functions of the above-described embodiments, and the recording medium which records the program codes constitutes the present invention.

The recording medium for supplying the program codes includes a Floppy® disk, hard disk, optical disk, magnetooptical disk, CD-ROM, CD-R, magnetic tape, nonvolatile memory card, and ROM.

The functions of the above-described embodiments are realized when the computer executes the readout program codes. Also, the functions of the above-described embodiments are realized when an OS (Operating System) or the like running on the computer performs part or all of actual processing on the basis of the instructions of the program codes.

Furthermore, the present invention includes a case in which, after the program codes read out from the recording medium are written in the memory of a function expansion board inserted into the computer or the memory of a function expansion unit connected to the computer, the CPU of the function expansion board or function expansion unit performs part or all of actual processing on the basis of the instructions of the program codes and thereby realizes the functions of the above-described embodiments.

As has been described above, according to the embodiments, an information output apparatus having a function of connecting an information storage terminal apparatus by simple operation and performing output processing can be wirelessly connected.

As many apparently widely different embodiments of the present invention can be made without departing from the spirit and scope thereof, it is to be understood that the invention is not limited to the specific embodiments thereof except as defined in the appended claims.

The invention claimed is:
1. An information processing apparatus, comprising:
  a scanning unit configured to scan a beacon signal sent from each of a plurality of access points operating in accordance with a wireless LAN defined by IEEE 802.11 series standard;
  a first determination unit configured to determine whether a printer having a predetermined function exists in a wireless network identified by identification information included in the beacon signal transmitted by one of the plurality of access points;
  a second determination unit configured to determine, if the first determination unit determined that no printer having the predetermined function exists, whether a printer having the predetermined function exists in a wireless network identified by identification information included in the beacon signal transmitted by another one of the plurality of access points;
  a transmission unit configured to transmit a print request to the printer having the predetermined function based on the determination result by the first determination unit or the second determination unit,
  wherein the plurality of access points include a printer which is operating as an access point, and the transmission unit directly transmits, if the printer having the predetermined function is the printer which is operating as an access point, the print request to the printer which is operating as an access point without going through an external access point.
2. The information processing apparatus according to claim 1, further comprising:
  an inquiring unit configured to inquire, of an access point in the plurality of wireless networks, whether the access point has a function of performing a print processing; and
  a control unit configured to control connection to the access point in accordance with a response to the inquiry.
3. The information processing apparatus according to claim 2, wherein the control unit controls, if the response to the inquiry is a positive response, to connect to the access point which has positively responded.
4. The information processing apparatus according to claim 2, wherein the control unit controls, if a plurality of access points which have positively responded exists, to connect to one of the plurality of access points which has first positively responded.
5. The information processing apparatus according to claim 4, wherein the control unit controls, if a plurality of access points which have positively responded exists and the print processing together with the one of the plurality of access points which has first positively responded abnormally ends, to connect to another access point of the plurality of access points which has positively responded.
6. The information processing apparatus according to claim 2, wherein the control unit controls, if the response to the inquiry is a negative response or no response exists, to connect to another access point in a wireless network other than the wirelessly connected wireless network.
7. The information processing apparatus according to claim 2, wherein the inquiry is performed by a broadcast message.
8. The information processing apparatus according to claim 1, wherein the information processing apparatus wirelessly communicates in a communication mode according to an infrastructure mode defined by IEEE 802.11.
9. The information processing apparatus according to claim 1, wherein the information processing apparatus wirelessly communicates in a communication mode according to an ad-hoc mode defined by IEEE 802.11.
10. A method for processing information, comprising the steps of:
  scanning a beacon signal sent from each of a plurality of access points operating in accordance with a wireless LAN defined by IEEE 802.11 series standard;
  a first determination step of determining whether a printer having a predetermined function exists in a wireless network identified by identification information included in the beacon signal transmitted by one of the plurality of access points;
  a second determination step of determining, if the first determination step determined that no printer having the predetermined function exists, whether a printer having the predetermined function exists in a wireless network identified by identification information included in the beacon signal transmitted by another one of the plurality of access points;
  transmitting a print request to the printer having the predetermined function based on the determination result of the first determination step or the second determination step,
  wherein the plurality of access points include a printer which is operating as an access point, and the transmission step directly transmits, if the printer having the redetermined function is the printer which is operating as an access point, the print request to the printer which is operating as an access point without going through an external access point.
11. A non-transitory computer-readable storage medium storing a computer program, the computer program causing a computer to execute a method comprising the steps of:
  scanning a beacon signal sent from each of a plurality of access points operating in accordance with a wireless LAN defined by IEEE 802.11 series standard;
  a first step of determining whether a printer having a predetermined function exists in a wireless network identified by identification information included in the beacon signal transmitted by one of the plurality of access points;
  a second determination step of determining, if the first determination step determined that no printer having the predetermined function exists, whether a printer having the predetermined function exists in a wireless network identified by identification information included in the beacon signal transmitted by another one of the plurality of access points;

transmitting a print request to the printer having the predetermined function based on the determination result by the first determination step or the second determination step, wherein the plurality of access points include a printer which is operating as an access point, and the transmission step directly transmits, if the printer having the redetermined function is the printer which is operating as an access point, the print request to the printer which is operating as an access point without going through an external access point.

* * * * *